United States Patent Office 2,822,407
Patented Feb. 4, 1958

2,822,407

1-TRIHALOMETHYL-3-METHYLCYCLOHEXANOLS

Sydney Archer, Delmar, N. Y., assignor to Sterling Drug Inc., New York, N. Y., a corporation of Delaware No Drawing. Application July 16, 1956
Serial No. 597,871

8 Claims. (Cl. 260—631)

This invention relates to novel cyclohexanol derivatives, and in particular it is concerned with 1-trihalomethylcyclohexanols having a methyl group in the 3-position, wherein the halogen atoms are chlorine or bromine. The invention also concerns a method for preparing these new compounds.

1-trichloromethylcyclohexanol is a known compound. When administered orally to cats in doses of 50 mg. per kg. of body weight or more, 1-trichloromethylcyclohexanol cauesd central nervous system depression, but with descending spastic paralysis. Other effects produced by this compound were excitement, mydriasis, occasional short clonic seizures, salivation and emesis. The toxicity of this compound in mice ($LD_{50}\pm$standard error) was $1020\pm54$ mg./kg. when administered subcutaneously and $860\pm140$ mg./kg. when administered orally.

Surprisingly, it has been found that 1-trihalomethyl-3-methylcyclohexanols where the halo atom is chlorine or bromine are useful as mild sedatives and hypnotics, effective at doses of 25–50 mg./kg. or more in cats, but lacking completely the undesirable side-effects manifested by the known 1-trichloromethylcyclohexanol. Thus, for instance, 1-trichloromethyl-3-methylcyclohexanol is significantly less toxic than 1-trichloromethylcyclohexanol, the former having a subcutaneous $LD_{50}$ of $1860\pm324$ mg./kg. and an approximate oral $LD_{50}$ greater than 2000 mg./kg.

The compounds of my invention possess the following structural formula:

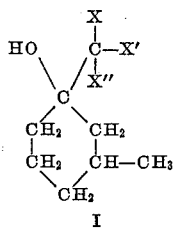

I wherein X, X' and X" are selected from the group consisting of chlorine or bromine atoms. The Formula I includes the following compounds: 1-trichloromethyl-3-methylcyclohexanol, 1-tribromomethyl-3-methylcyclohexanol, 1 - dichlorobromomethyl - 3 - methylcyclohexanol, and 1 - chlorodibromomethyl - 3 - methylcyclohexanol.

The compounds of structure I are prepared by treating 3-methylcyclohexanone with a trihalogenated methane, HCXX'X", in the presence of a strong base. The reaction takes place readily without external heating; in fact, external cooling to temperatures below about 0° C. is preferred to render the reaction readily controllable and to prevent undesirable side-reactions. The reaction can be carried out by simple admixture of the reactants, although it is preferred to use a reaction medium which is inert under the conditions of the reaction; a convenient medium is methylal (dimethoxymethane). Approximately equimolar quantities of 3-methylcyclohexanone and trihalomethane are used, although an excess of trihalomethane can be used if desired. The strong base serves as a catalyst which activates the carbonyl group of the 3-methylcyclohexanone for the addition of the trihalomethane. Illustrative of such strong bases are the alkali metal hydroxides, amides or hydrides. A preferred strong base is potassium hydroxide.

The structure of the compounds produced is established by chemical analysis and by the mode of synthesis.

The following examples will further illustrate the invention without limiting the same thereto.

Example 1

*1 - trichloromethyl - 3 - methylcyclohexanol.*—Powdered potassium hydroxide (98.4 g.) was placed in a 1-liter round-bottom flask equipped with a drying tube, thermometer, dropping funnel and stirrer. Methylal (410 ml.) was then added and the mixture was cooled to —4° C. A solution of 100 g. (0.89 mole) of 3-methylcyclohexanone and 173 g. (132 ml., 1.45 mole) of chloroform was added dropwise to the stirred mixture during a period of two hours while maintaining the temperature below —1° C. The reaction mixture was stirred at below —1° C. for two hours more and then was poured into a mixture of crushed ice and 46 ml. of concentrated sulfuric acid. The aqueous layer and the organic layer were separated, and the aqueous phase was extracted with two portions of ether. The combined organic layers were dried over anhydrous calcium sulfate for about fifteen hours. The volatile solvents were removed at atmospheric pressure and the residue was distilled in vacuo. A forerun, 23 g., B. P. 38–77° C. (0.5 mm.) was obtained which consisted mainly of recovered 3-methylcyclohexanone. The main fraction, 120 g., was collected at 77–81° C. (0.1 mm.). The main fraction was purified by dissolving it in 600 ml. of pentane and cooling to —70° C. in a Dry Ice bath. After one hour the solid material which had separated was collected on a precooled funnel, washed with precooled pentane (—70° C.) and dried in vacuo at room temperature, giving 85 g. of 1-trichloromethyl - 3 - methylcyclohexanol, M. P. 39–41° C. (corr.).

*Analysis.*—Calcd. for $C_8H_{13}Cl_3O$: C, 41.49; H, 5.66. Found: C, 41.65; H, 5.41.

By replacement of the chloroform in the preceding preparation by a molar equivalent amount of dichlorobromomethane or chlorodibromomethane, there can be obtained, respectively, 1-dichlorobromomethyl-3-methylcyclohexanol or 1-chlorodibromomethyl-3-methylcyclohexanol.

Example 2

*1-tribromomethyl-3-methylcyclohexanol* was prepared from 100 g. (0.89 mole) of 3-methylcyclohexanone and 227.7 g. (0.90 mole) of bromoform in 450 ml. of methylal in the presence of 54 g. of powdered potassium hydroxide according to the manipulative procedure described above in Example 1. The main fraction of the distilled product, 149.9 g., B. P. 118° C. (0.4 mm.) was crystallized from pentane at —75° C., giving 1-tribromomethyl-3-methylcyclohexanol, M. P. 44–48° C. (corr.).

*Analysis.*—Calcd. for $C_8H_{13}Br_3O$: C, 26.33; H, 3.59; Br, 65.71. Found: C, 26.47; H, 3.90; Br, 65.05.

The compounds of the invention can be prepared for use by encapsulation either per se or with conventional excipients for oral administration, similar to the manner in which chloral hydrate or chlorobutanol (1,1,1-trichloro-2-methyl-2-propanol) are formulated.

I claim:
1. A 1-trihalomethyl-3-methylcyclohexanol having the formula

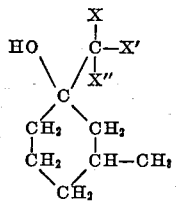

wherein X, X' and X" are selected from the group consisting of chlorine and bromine.
2. 1-trichloromethyl-3-methylcyclohexanol.
3. 1-tribromomethyl-3-methylcyclohexanol.
4. The process for preparing a 1-trihalomethyl-3-methylcyclohexanol having the formula

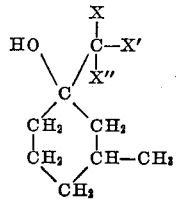

wherein X, X' and X" are members of the group consisting of chlorine and bromine, which comprises reacting 3-methylcyclohexanone with a compound having the formula HCXX'X" in the presence of a strong base.

5. The process for preparing 1-trichloromethyl-3-methylcyclohexanol, which comprises reacting 3-methylcyclohexanone with chloroform in the presence of a strong base.

6. The process for preparing 1-tribromomethyl-3-methylcyclohexanol, which comprises reacting 3-methylcyclohexanone with bromoform in the presence of a strong base.

7. The process for preparing 1-trichloromethyl-3-methylcyclohexanol, which comprises reacting in methylal solution 3-methylcyclohexanone with chloroform in the presence of potassium hydroxide.

8. The process for preparing 1-tribromomethyl-3-methylcyclohexanol, which comprises reacting in methylal solution 3-methylcyclohexanone with bromoform in the presence of potassium hydroxide.

References Cited in the file of this patent
UNITED STATES PATENTS

| | | |
|---|---|---|
| 2,462,389 | Harrington | Feb. 22, 1949 |
| 2,525,249 | Weizmann | Oct. 10, 1950 |